United States Patent [19]

Umetsu

[11] Patent Number: 4,599,615
[45] Date of Patent: Jul. 8, 1986

[54] PAGER RECEIVER COMPRISING A MEMORY STORING A SEQUENCE OF INFORMATION SIGNALS TO BE TESTED

[75] Inventor: Shinjiro Umetsu, Tokyo, Japan

[73] Assignee: Nippon Electric Co., Ltd., Tokyo, Japan

[21] Appl. No.: 460,736

[22] Filed: Jan. 25, 1983

[30] Foreign Application Priority Data

Jan. 26, 1982 [JP] Japan ................................. 57-11415
Dec. 6, 1982 [JP] Japan ................................. 57-213675

[51] Int. Cl.[4] .......................... H04Q 9/00; H04B 5/04
[52] U.S. Cl. .................................. 340/825.44; 455/67
[58] Field of Search .................... 340/825.44; 455/56, 455/76, 343, 31–38, 67; 371/16, 19, 20, 21, 22, 27, 29; 377/19, 29

[56] References Cited

U.S. PATENT DOCUMENTS

| 4,021,645 | 5/1977 | Saufferer et al. | 377/29 |
| 4,271,512 | 6/1981 | Lyhus | 377/29 |
| 4,351,059 | 9/1982 | Gregore et al. | 371/27 |
| 4,383,312 | 5/1983 | Reed | 371/27 |
| 4,415,770 | 11/1983 | Kai et al. | 455/67 |
| 4,475,195 | 10/1984 | Carey | 371/22 |

FOREIGN PATENT DOCUMENTS 2088604 6/1982 United Kingdom .............. 455/343

Primary Examiner—Donald J. Yusko
Attorney, Agent, or Firm—Sughrue, Mion, Zinn, Macpeak & Seas

[57] ABSTRACT

In a pager receiver comprising a display circuit and an ROM, a controller produces a test mode signal indicative of a test mode in which either the display circuit or the ROM is tested. Responsive to the test mode signal, the ROM supplies the display circuit with a succession of display signals which are previously stored therein and representative of all alphanumeric symbols displayed by the display circuit, so as to test the display circuit. Alternatively, all of contents stored in the ROM are successively sent from the ROM to the display circuit in response to the test mode signal on testing the ROM, so as to inspect the contents. The test mode signal may be delivered from a transmitting end to the controller in the form of a radio calling signal or given to the controller by manual operation. The test mode signal may specify more than two sorts of tests.

5 Claims, 7 Drawing Figures (1) 1111111111
(2) 2222222222
(3) 3333333333
(4) 4444444444
(5) 5555555555
(6) 6666666666
(7) 7777777777
(8) 8888888888
(9) 9999999999
(10) 0000000000

PAGER RECEIVER COMPRISING A MEMORY STORING A SEQUENCE OF INFORMATION SIGNALS TO BE TESTED

BACKGROUND OF THE INVENTION

This invention relates to a pager receiver which is capable of displaying alphanumeric symbols, such as numbers, characters, and the like. It should be noted here throughout the instant specification that such a pager receiver for displaying the alphanumeric symbols may be called merely a pager receiver for brevity of description.

A pager receiver of the type described comprises a display unit, such as a liquid crystal display (an LCD) unit, for displaying alphanumeric symbols, a display driver for driving the display device, and a read-only memory (an ROM) for storing display signals representative of the alphanumeric symbols.

With such a pager receiver, troubles and malfunctions sometimes take place in the display unit per se and the display driver. In order to detect the troubles and the malfunctions, a display test must be carried out either at the beginning or during operation of the pager receiver by transmitting a predetermined number of test patterns from a transmitting end to the pager receiver and by making the display unit visually display the test patterns. During the display test, all alphanumeric symbols should be displayed by the display unit. Otherwise, the display test does not make sense.

Inasmuch as the transmission of the test patterns must be carried out on the display test, an encoder of the transmitting end should be modified or changed in design when the test patterns are varied. In addition, a procedure for the display test becomes intricate as the number of the test patterns increase with an increase of the alphanumeric symbols.

However, all of contents, or the display signals stored in the ROM should be inspected or tested in order to be collated with desired signals. For this purpose, two methods have been implemented for inspection of the contents. A first one of the methods is to mechanically detach the ROM from the pager receiver so as to read the contents out of the ROM by the use of a code programmer as called in the art. The first method needs a long time to inspect the contents and inevitably reduces a reliability of the inspection, because the ROM is once detached from the pager receiver. In addition, the code programmer must be prepared on carrying out the inspection.

A second one of the methods is to inspect the contents of the ROM detaching the ROM from the pager receiver. With the second method, a plurality of key codes which are in one-to-one correspondence to the contents of the ROM are transmitted from the transmitting end to the pager receiver so as to make the display unit visually display the contents of the ROM. In order to display all contents of the ROM with the second method, a number of the key codes should successively be sent from the transmitting end to the pager receiver in question. The second method is therefore troublesome and needs a long time.

SUMMARY OF THE INVENTION

It is an object of this invention to provide a pager receiver which is capable of simply and readily testing a display unit, an ROM, and/or the like in a short time.

It is another object of this invention to provide a pager receiver of the type described, which is capable of making the display automatically and visually display a lot of test patterns without any change of an encoder included in a transmitting end.

It is a further object of this invention to provide a pager receiver of the type described, which is capable of testing contents of the ROM with a high reliability.

A pager receiver to which this invention is applicable is operable in a normal mode and a test mode in which the pager receiver is tested by visually displaying a sequence of information signals. According to this invention, the pager receiver comprises first means for producing a test mode signal indicative of the test mode, second means for storing the information signal sequence as a sequence of stored codes to successively produce the stored codes in response to the test mode signal, and third means operatively coupled to the first and the second means for visually and successively displaying the stored codes as the information signal sequence to test at least one of the second and the third means when the test mode signal is produced by the first means.

DESCRIPTION OF THE PREFERRED EMBODIMENTS

Figure 1:
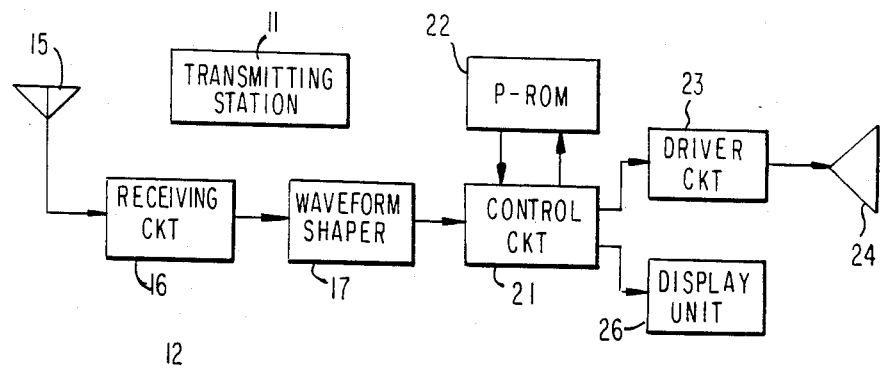
FIG. 1 shows in blocks, together with a transmitting station, a pager receiver according to a first embodiment of this invention.

Referring to FIG. 1, a paging system comprises a transmitting station 11 having a certain service area. The system further comprises a plurality of pager receivers one of which is depicted at 12 as a representative of the pager receivers of the system.

A plurality of subscriber substations (not shown) are connected to the transmitting station 11. When a call originates from one of the subscriber substations to the illustrated pager receiver 12, the call is conveyed from the transmitting station 11 to the pager receiver 12 over the service area in the form of a radio calling signal.

The illustrated pager receiver 12 is operable in a normal mode and a test mode. In this connection, the radio calling signal carries a predetermined test code specifying the test mode, as will become clear.

Figure 2:
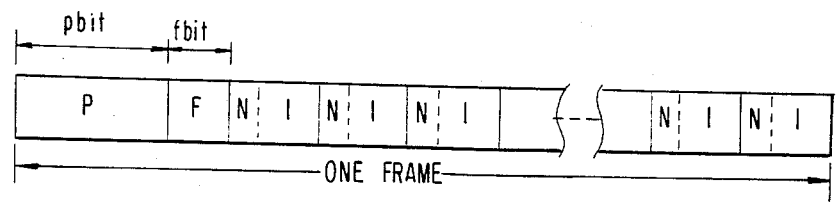
FIG. 2 exemplifies a format of a radio calling signal which is to be received by the pager receiver illustrated in FIG. 1.

Turning to FIG. 2, each frame of the radio calling signal comprises a preamble signal P of p bits and a frame synchronizing code F of f bits. The bit numbers p and f may be, for example, 225 and 32, respectively. The frame synchronizing code F appears at every frame period and serves to establish frame synchronism of call or directory number and message codes N and I. Herein, it should be noted that the predetermined test code is substituted for the frame synchronizing code F at every period equal to a preselected number of the frame periods. For this purpose, the transmitting station 11 (FIG. 1) comprises a counter (not shown) for counting the number of the frame synchronizing codes to the preselected number and a pattern generator (not shown) for generating a pattern or patterns preassigned to the test mode code, so as to substitute the predetermined test code for the frame synchronizing code F. The frame synchronism is not disturbed by such substitution because the substitution is intermittently carried out. The frame synchronizing code F is followed by a plurality of the call number codes N and a plurality of message codes I, each appearing at every other call number code. A leading one of the call number codes N follows immediately after the frame synchronizing code F.

Referring back to FIG. 1, the pager receiver 12 comprises an antenna 15 for receiving the radio calling signal. An ordinary receiving circuit 16 is for subjecting the received radio calling signal to frequency conversion, amplification, and demodulation. The receiving circuit 16 comprises a discriminator (not shown) which produces the demodulated calling signal. A waveform shaper 17 is for shaping the waveform of the demodulated calling signal to produce a reproduction of a digital signal which is produced in the transmitting station 11 for transmission as the radio calling signal. The receiving circuit 16 and the waveform shaper 17 are known in the art. For example, the receiving circuit 16 may be of the type described in U.S. Pat No. 4,194,153 issued to Masaru Masaki et al and assigned to present assignee. The waveform shaper may be of the structure comprising a low-pass filter and a comparator. A combination of the receiving circuit 16 and the waveform shaper 17 may be called a receiving section.

The reproduction of the digital signal, namely, a reproduced digital signal is supplied from the waveform shaper 17 to a control circuit 21. The reproduced digital signal comprises reproductions of the preamble signal, the frame synchronizing code, and/or the predetermined test code together with reproductions of the call number and the message codes. For brevity of description, the word "reproduction" or "reproduced" will be omitted hereinafter from the above-mentioned signals and codes so long as no confusion arises.

Briefly, the control circuit 21 cooperates with a programmable read-only memory (P-ROM) 22 storing a self-call number code preassigned to the pager receiver 12, a drive circuit 23 for making a loudspeaker 24 produce a call tone or a beep tone, and a display unit 26 for displaying the message codes. The display unit 26 may comprise a five-by-seven dot matrix liquid crystal display of ten-digits when each of the message codes represents an alphanumeric symbol. The display unit 26 may be a ten-digit seven-segment liquid crystal display when the message is represented only by numerals. The latter display unit is assumed to be used in the illustrated pager receiver 12.

The pager system is operable to test the display unit 26. It is mentioned here that the predetermined test code produced by the transmitting station 11 is indicative of the test of the display unit 26.

Figure 3:
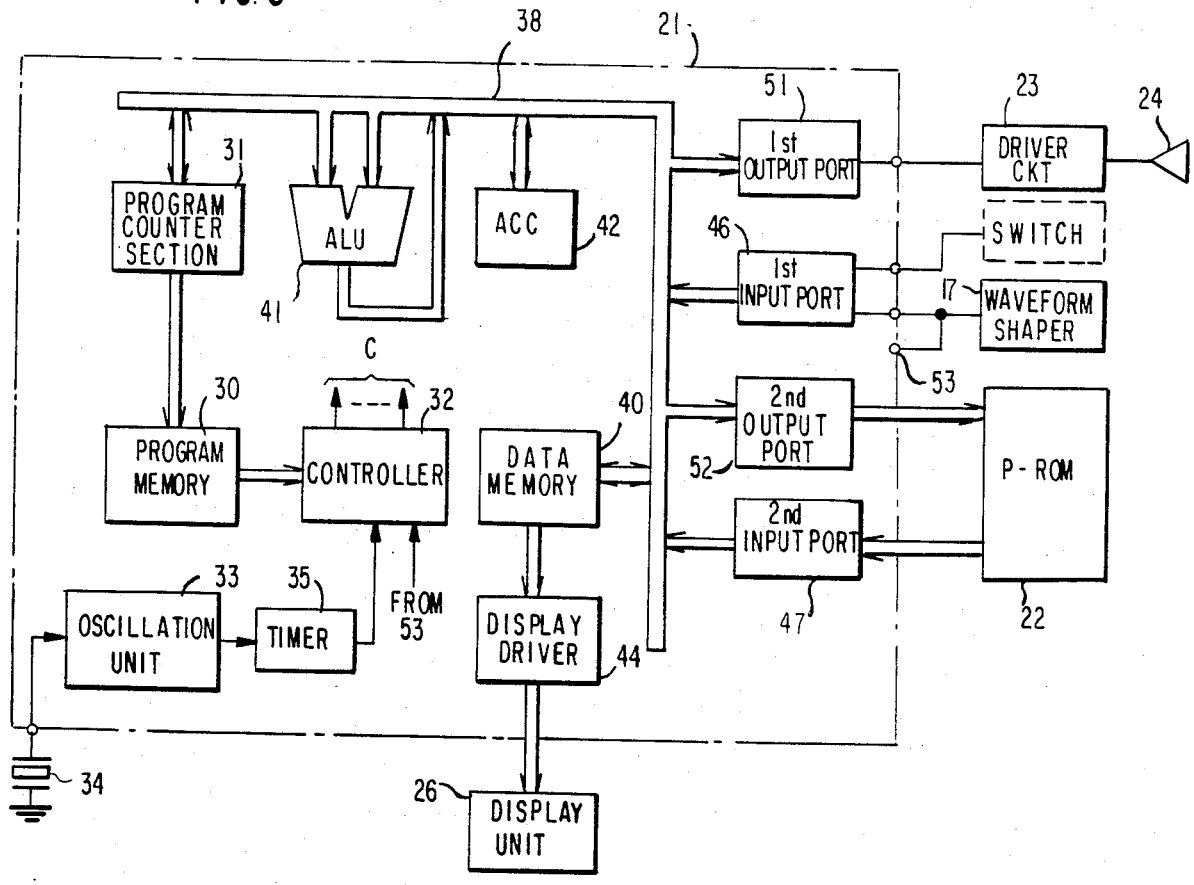
FIG. 3 shows a block diagram of a control circuit used in the pager receiver illustrated in FIG. 1.

Referring to FIG. 3 afresh and FIG. 1 again, the control circuit 21 is constituted by a one chip microprocessor which may be μPD7502G manufactured and sold by Nippon Electric Co., Ltd., Tokyo, Japan. The control circuit 21 comprises a program memory 30 for storing a predetermined program composed of a succession of instructions and a conversion table for converting the message codes into display data or codes, respectively. Thus, the display data also are stored in the program memory 30 together with the program. In addition, a specific synchronizing pattern code is also stored in the program memory 30 to detect the frame synchronizing code produced by the transmitting station 11. The specific synchronizing pattern code has therefore the same pattern as the frame synchronizing code. It is to be noted here that the program memory 30 further stores a test pattern code identical with the predetermined test code produced by the transmitting station 11, respectively, and a sequence of information signals to be displayed by the display unit in the test mode. The information signal sequence is produced as a sequence of stored codes in a manner to be described later. From this fact, it is readily understood that the program memory 30 comprises an area for storing the information sequence as the stored code sequence.

A program counter section 31 is coupled to the program memory 30 for use in accessing the program memory by an address signal or a content kept in the program counter section 31. The content of the program counter section 31 is usually counted up by one at every instruction but sometimes rewritten by particular instructions, such as jump instructions or the like.

At any rate, the program memory 30 produces the instructions, the display data, the codes, and the signal sequence stored therein in accordance with the address signal kept in the program counter section 31.

Responsive to the instructions, a controller 32 is put into operation in synchronism with a clock pulse sequence to deliver various kinds of control signals C to structural elements included in the control circuit 21. In this event, the above-mentioned codes and stored signals are also produced as the control signals C from the controller 32.

In order to supply the clock pulse sequence to the controller 32, the control circuit 21 further comprises an oscillation unit 33 connected to a quartz crystal 34 located outside of the control circuit 21 and a timer 35 connected between the oscillation unit 33 and the controller 32.

In FIG. 3, the program counter section 31 is coupled through a data bus 38 to a data memory 40. As a result, the address signal kept in the program counter section 31 can be delivered to the data memory 40 under control of the controller 32. Additionally, the program counter section 31 is supplied with a jump address signal indicative of a jump address through the data bus 38.

An arithmetic logic unit (ALU) 41 and an accumulator (ACC) 42 are coupled to the data bus 38 to execute each instruction as will become clear as the description proceeds. Let the accumulator 42 be loaded through the controller 32 with the codes, the display data, and the information signal sequence stored in the program memory 32 in the form of the control signals. Therefore, each of the codes, the display data, and the information signal sequence is selectively memorized from the accumulator 42 in accordance with the address signal kept in the program counter section 31.

The control circuit 21 further comprises a display driver 44 between the data memory 40 and the display unit 26. The display driver 44 converts the display data and the information signal sequence stored in the data memory 40 into display drive signals which are capable of driving the display unit 26. As a result, each of the display data and the information signal sequence is visually displayed by the display unit 26.

The data bus 38 is coupled to first and second input ports 46 and 47 connected to the waveform shaper 17 and the programmable read-only memory 22, respectively, and is also coupled to first and second output ports 51 and 52 connected to the drive circuit 23 and the programmable read-only memory 22, respectively. In addition, the waveform shaper 17 is coupled through an inhibit terminal 53 (will later become clear) to the controller 32.

The control circuit 21 is put into operation in the normal mode to establish bit synchronism and frame synchronism with reference to the clock pulse sequence generated therein, and to the preamble signal, and the frame synchronizing code both of which are derived from the digital signal supplied from the waveform shaper 17.

Figure 4:
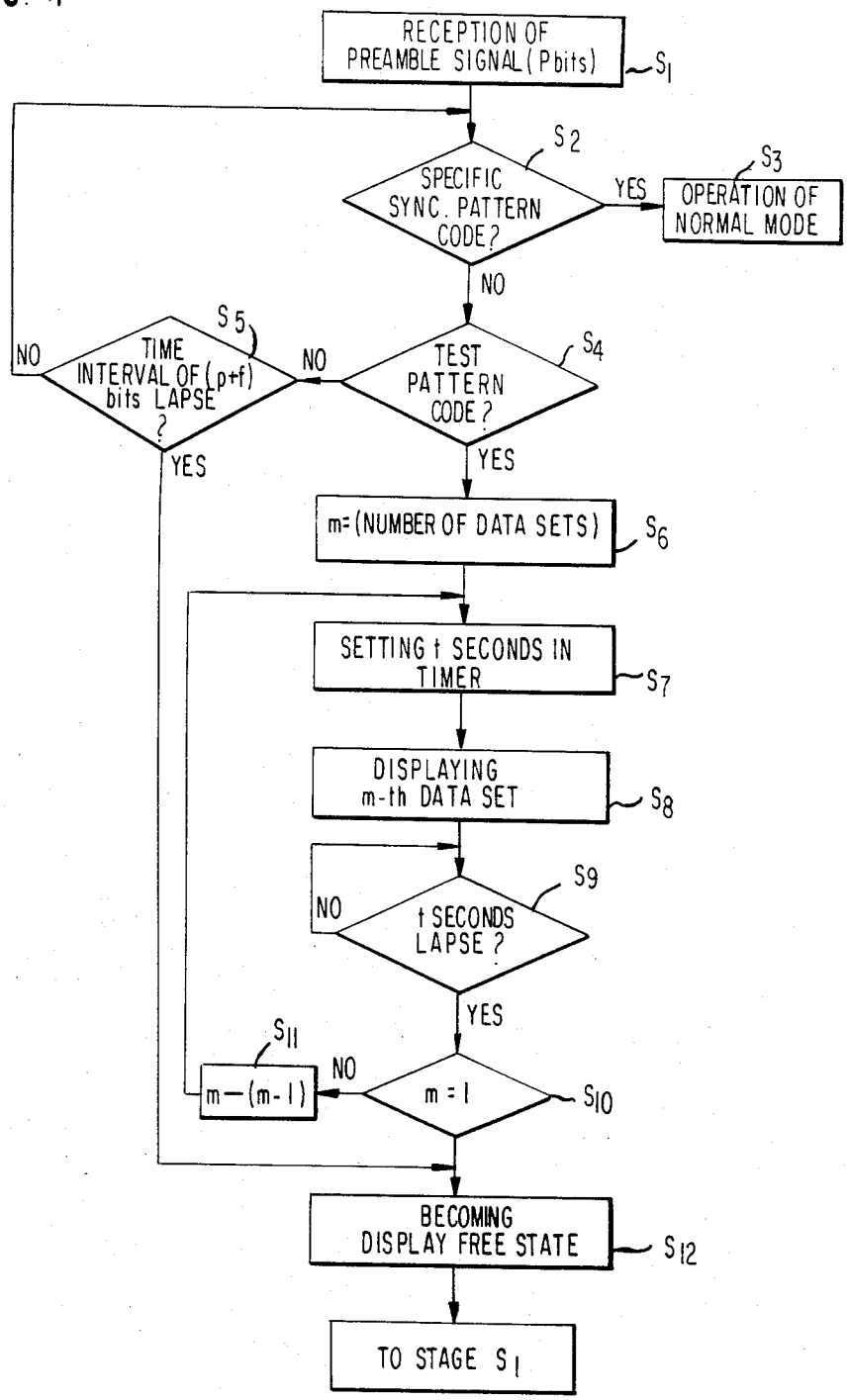
FIG. 4 is a flow chart for use in describing operation of the pager receiver mentioned in conjunction with FIGS. 1 and 3.

Referring to FIG. 4 together with FIG. 3, the control circuit 21 monitors the digital signal to receive the preamble signal P at a first stage $S_1$ in a well-known manner. Specifically, the first stage $S_1$ is for establishing the bit synchronism with reference to the preamble signal and for detecting the preamble signal P. It should be noted here that the digital signal is supplied from the waveform shaper 17 not only to the data bus 38 through the first input port 46 but also to the controller 32 through the inhibit terminal 53. The bit synchronism is established by periodically interrupting operation of the controller 32 by the use of the digital signal, namely, the preamble signal supplied through the inhibit terminal 53 to the controller 32. Responsive to the digital signal through the inhibit terminal 53, the controller 32 controls the timer 35 to synchronize the digital signal with the clock pulse sequence. Any interruption is inhibited in the controller 32 when the bit synchronism is once established. Thereafter, the controller 32 detects the preamble signal P. Such detection of the preamble signal P is readily possible by counting the digital signal to a preselected number of, for example, 15 because the preamble signal P has usually a prescribed repetition pattern of binary one and zero bits.

The first stage $S_1$ is followed by a second stage $S_2$ after detection of the preselected number of bits of the preamble signals P. At the second stage $S_2$, the specific pattern code is read out of the program memory 30 to check whether or not the frame synchronizing code is present in the digital signal. For this purpose, the accumulator 42 is loaded through the controller 32 with the specific pattern code in the form of the control signals C and is thereafter moved from the accumulator 42 to the data memory 40. In addition, the self-call number code preassigned to the pager receiver 12 is also read out of the programmable read-only memory 22 to be kept in the accumulator 42 through the second input port 47 and the data bus 38. At this time, the programmable read-only memory 22 is accessed through the data bus 38 and the second output port 52 by the address signal supplied from the program memory 30 through the accumulator 42.

Under these circumstances, the digital signal is successively supplied from the waveform shaper 17 through the first input port 46 and the data bus 38 to the accumulator 42. The digital signal kept in the accumulator 42 is thereafter compared by the arithmetic logic unit 41 with the specific pattern code memorized in the data memory 40 under control of the controller 32. When the digital signal coincides with the specific pattern code, the second stage $S_2$ is followed by a third stage $S_3$ and, otherwise, the second stage $S_2$ is followed by a fourth stage $S_4$.

At the third stage $S_3$, operation is carried out in the normal mode. More specifically, the self-call number code is moved from the data memory 40 to the arithmetic logic unit 41 to be compared with the digital signal. When the digital signal is coincident with the self-call number code, the loudspeaker 24 is driven through the first output port 51 and the drive circuit 23 to cause the call or the beep tone in a usual manner. Although not illustrated in FIG. 4, the accumulator 42 is subsequently loaded with the message codes I as illustrated in FIG. 2, only when the coincidence is detected between the self-call number code and the digital signal. The message codes I are converted into the display data by the use of the conversion table stored in the program memory 30. The display data are stored in the data memory 40 to be sent through the display driver 44 to the display unit 26 as the display drive signals.

On the other hand, when incoincidence is detected at the second stage $S_2$, operation proceeds to the fourth stage $S_4$. At the fourth stage $S_4$, the control circuit 21 checks if the digital signal comprises the same pattern as the test pattern code memorized in the program memory 30. Specifically, the test pattern code is previously transferred from the program memory 30 to the data memory 40 through the controller 32, the accumulator 42, and the data bus 38 on reception of the preamble signal P. The digital signal which was compared with the specific pattern code at the second stage $S_2$ is kept in the accumulator 42. In this state, the arithmetic logic unit 41 compares the above-mentioned digital signal with the test pattern code under control of the controller 32.

A fifth stage $S_5$ follows the fourth stage $S_4$ when incoincidence is found out between the digital signal and the test pattern code as a result of comparison. At the fifth stage $S_5$, the controller 32 checks whether or not a time interval of (p+f) bits lapses after the detection of the preamble signal P. Before the elapse of the time interval of (p+f) bits, processing operation returns back to the second stage $S_2$. Otherwise, the controller 32 becomes an initial state in which the preamble signal P can be received.

When the digital signal is coincident with the test pattern code at the fourth stage $S_4$, the arithmetic logic unit 41 produces a test mode signal indicative of the test mode. Thus, the arithmetic logic unit 41 is put into operation as a test mode signal producing circuit. The pager receiver 12 proceeds to the test mode by production of the test mode signal. Specifically, the test mode signal is moved to the accumulator 42 to be kept therein. The controller 32 detects the test mode signal in the accumulator 42 to make the program memory 30 transfer the information signal sequence to the data memory 40 through the controller 32. As mentioned before, the information signal sequence is to be displayed by the display unit 26 in a manner to be described later.

In the test mode, a sixth stage $S_6$ succeeds the fourth stage $S_4$. At the sixth stage $S_6$, the controller 32 indicates a preselected number m of data sets of the information signals to load the accumulator 42 with the preselected number m of the data sets.

Figures 5, 6:
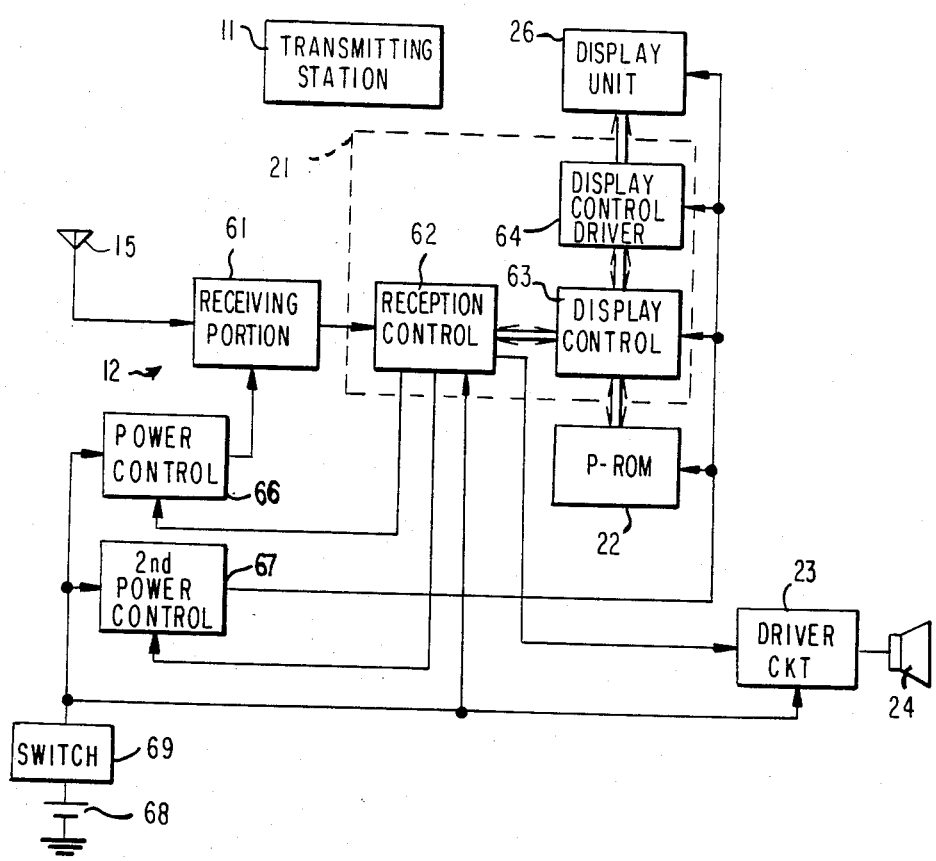
FIG. 5 is a view for describing a test of a display unit included in the pager receiver illustrated in conjunction with FIGS. 1, 3, and 4.
FIG. 6 shows in blocks, together with a transmitting station, a pager receiver according to a second embodiment of this invention.

Temporarily referring to FIG. 5, the preselected number m of the data sets is equal to ten when the illustrated display unit 26 of ten digits is a seven-segment liquid crystal display and can visually display only numerals, as suggested by consecutive numbers from (1) to (10) on the left side of FIG. 5. This is because ten kinds of numerals or decimal numbers can be visually displayed at every digit of the illustrated display unit 26.

Inasmuch as all of the numerals should visually be displayed at every digit on testing the display unit 26, it should be noted that the preselected number m of the data sets inevitably increases with an increase of symbols which can be displayed at every digit of the display unit 26.

Referring to FIGS. 3 and 4 again, each of the data sets displayed as illustrated in FIG. 5 is now stored as the information signal sequence in the data memory 40 in response to the test mode signal, as mentioned before.

A particular register of the accumulator 42 is loaded with the preselected number m as a content of the particular register. For convenience of description, the particular register will be designated by (m) hereinafter.

Under these circumstances, a time interval of t seconds is set in the timer 35 by the controller 32 at a seventh stage $S_7$. The t seconds may be equal, for example, to 8 seconds. The time interval t determines a duration during which each data set is continuously displayed by the display unit 26.

At an eighth stage $S_8$, an m-th one of the data sets that may be the tenth data set depicted at (10) in FIG. 5 is first produced as stored codes from the data memory 40 to be displayed by the display unit 26. From this fact, it is readily understood that a combination of the program memory 30 and the data memory 40 is operable as a memory section for successively producing the stored codes in response to the test mode signal.

At a ninth stage $S_9$, the controller 32 checks whether or not the time interval t lapses. As long as the time interval t does not yet lapse, the m-th data set continues to be displayed by the display unit 26. After the elapse of the time interval t, the ninth stage $S_9$ is succeeded by a tenth stage $S_{10}$.

At the tenth stage $S_{10}$, the controller 32 checks if all of the data sets are displayed by the display unit 26. Such checking operation is carried out by comparing the content m of the particular register (m) of the accumulator 42 with unity by the use of the arithmetic logic unit 42. If the content m is not equal to unity, the controller 32 makes the arithmetic logic unit 41 substract one from the content m at an eleventh stage $S_{11}$. In consequence of subtraction, a difference (m−1) is kept in the particular register (m) as a rewritten content. Thereafter, processing returns back to the seventh stage $S_7$ to repeatedly carry out operation specified by the seventh through the tenth stages $S_7$ to $S_{10}$ until the content of the particular register (m) is equal to unity.

After detection of equality of the content of the particular register (m) to unity, the display unit 26 is reset by a reset signal supplied from the controller 32 as one of the control signals and becomes a display free state, as shown at a twelfth stage $S_{12}$. Subsequently, operation returns back to the first stage $S_1$. Thus, the display unit 26 is operated in cooperation with the arithmetic logic unit 41 and the data memory 40.

Inasmuch as all of the data sets to be displayed by the display unit 26 are stored in the program memory 30 or the data memory 40 included in the pager receiver 12, none of the data sets are transmitted from the transmitting station 11. In other words, it is possible to test the display unit 26 by transmitting the predetermined test code only one time from the transmitting station 11 to the pager receiver 12.

Since the test code is substituted for the frame synchronizing code F, a plurality of pager receivers can simultaneously be tested if they are operable in the manner similar to the illustrated pager receiver 12. The test code may be substituted for one of the preamble signal, the call number signals N, and the display signals I.

In order to put the pager receiver into the test mode, the first input port 46 may be supplied by manual operation with a mode signal specifying each of the normal and the test modes. Supply of such a mode signal is possible by connecting a switch (suggested by a broken line block) to the first input port 46. In this event, the arithmetic logic unit 41 produces the test mode signal under control of the controller 32 when the mode signal specifies the test mode.

Referring to FIG. 6, another pager system comprises similar parts designated by like reference numerals. In FIG. 6, the pager receiver 12 comprises a receiving section 61 equivalent to a combination of the receiving circuit 16 and the waveform shaper 17, both being illustrated in FIG. 1. The control circuit 21 illustrated in FIG. 6 is divided into a reception control circuit 62, a display control circuit 63, and a display control driver 64. The reception and the display control circuits 62 and 63 will be described later. The display control driver 64 is equivalent to the display driver 44 illustrated with reference to FIG. 3.

In the example being illustrated, it is assumed that the display unit 26 is a ten-digit five-by-seven dot matrix liquid crystal display and an alphanumeric symbol represented by each of the message codes can therefore be displayed as each of the display data at every digit.

Herein, let the message codes specify alphanumeric codes, respectively. In this event, the message codes should be converted into display codes which can be displayed by the display unit 26 when each of the message codes in indicative of a message or a symbol except a numeral or a decimal number. This is because all of the message codes are given in the form of any numerals which may be, for example, hexadecimal numbers, respectively. Accordingly, the display codes which are in one-to-one correspondence to the message codes whould be stored in the pager receiver 12.

In the illustrated pager receiver 12, the display codes are stored in the programmable read-only memory 22 together with the self-call number code. For convenience of description, such display codes stored as an information signal sequence in the read-only memory 22 will be called key codes hereinafter. In addition, the programmable read-only memory 22 memorizes function signals representative of functions to be fulfilled in the pager receiver 12. The functions may be, for example, a function for autoresetting the display unit 26, a battery-saving function, and the like.

In FIG. 6, first and second power controllers 66 and 67 are illustrated together with a d.c. power source or a battery 68 and a switch 69 for putting the pager receiver 12 into operation. Each of the first and the second power controllers 66 and 67 is intermittently energized by the reception control circuit 62, in order to save electrical power. In other words, the first and the second power controllers 66 and 67 are operable as battery-saving circuits.

It should be noted here that the illustrated pager system serves to test the display codes or contents of the programmable read-only memory 22 by making the display unit 26 visually display all of the display codes. Herein, it is assumed that the transmitting station 11 produce a radio calling signal similar to that illustrated in FIG. 2 and that the radio calling signal comprises a specific test code for specifing the programmable read-only memory 22. Let the specific test code be substituted for one of the message codes I illustrated in FIG. 2. When the radio calling signal is of a binary coded decimal code, the specific test code may be assigned with hexadecimal numbers A, B, C, D, E, and F which are unused to express decimal numbers.

Figure 7:
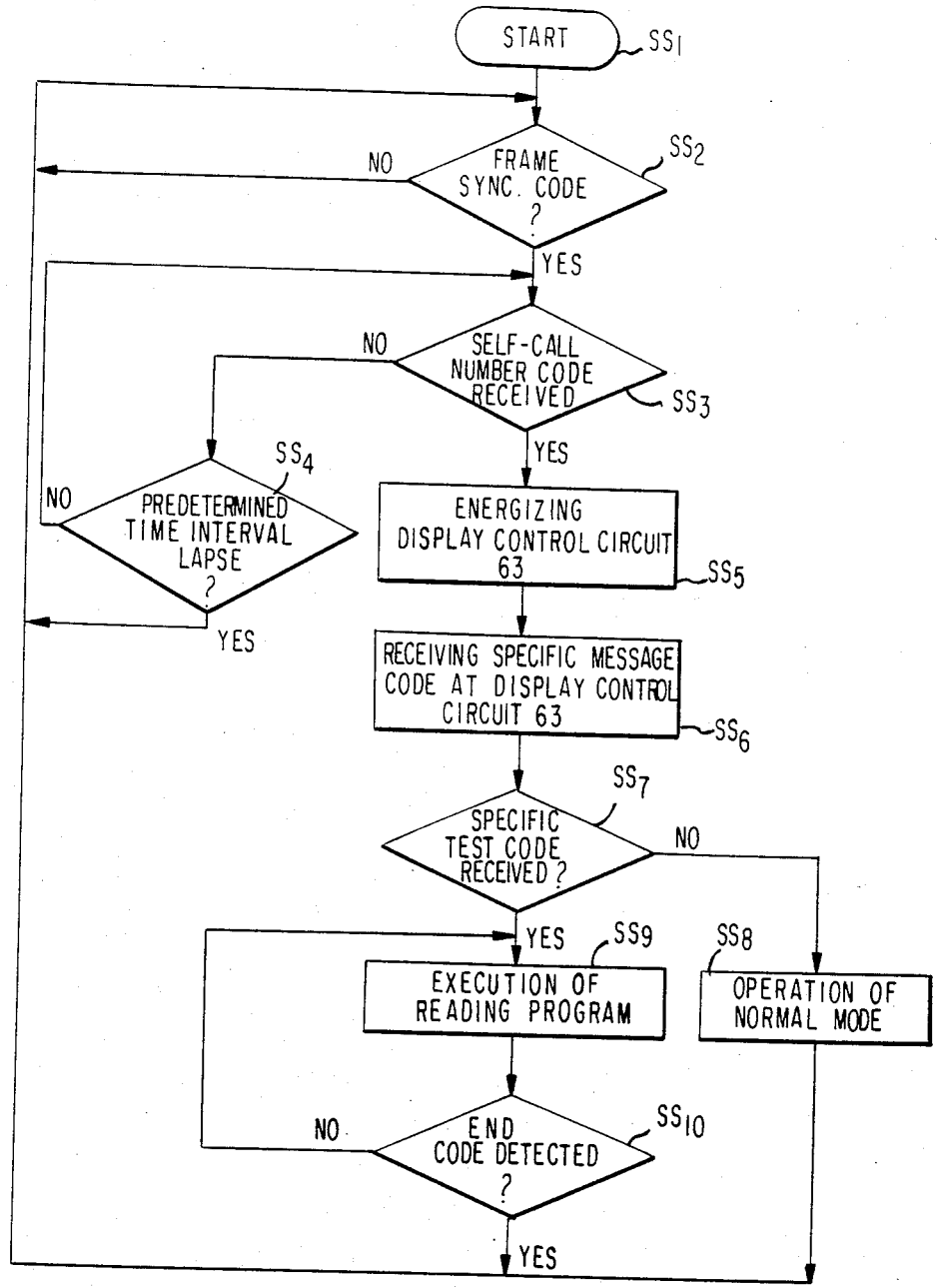
FIG. 7 is a flow chart for use in describing operation of the pager receiver illustrated in FIG. 6.

Referring to FIG. 7 afresh and FIG. 6 again, the pager receiver 12 starts to operate at a first stage $SS_1$ when the switch 69 is closed by a user. As a result, the pager receiver 12 is energized to receive the radio calling signal supplied through the antenna 15. Precisely, the power is supplied to the receiving section 61 from the battery 68 through the switch 69 and the first power control circuit 66 which is subject to control of the reception control section 62. The power is also supplied to the read-only memory 22, the display unit 26, the dislay control circuit 63, and the display control driver 64 through the switch 69 and the second power control circuit 67. In addition, the reception control circuit 62 and the driver circuit 23 are driven by the battery 68 through the switch 69 alone. Such a method of delivering the power to the above-mentioned elements is known in the art. Accordingly, the power delivering method is not described in the instant specification longer.

At any rate, the reception control circuit 62 is supplied with the digital signal from the receiving section 61, as is the case with FIG. 1.

For brevity of description, it is assumed that the bit synchronism is established with reference to the preamble signal P illustrated in FIG. 2 and that the preamble signal P is detected in the manner described with reference to FIGS. 3 and 4.

Under these circumstances, the reception control circuit 62 at first detects the frame synchronizing code F at a second stage $SS_2$. For this purpose, the reception control circuit 62 comprises a control memory (not shown) which is similar to the program memory 30 illustrated in FIG. 3 and which stores the synchronizing pattern code. In addition to the control memory, the reception control circuit 62 comprises a reception control unit.

If no frame synchronizing code F is detected, the second stage $SS_2$ is repeated in the reception control circuit 62.

After detection of the frame synchronizing code F included in the digital signal, the first stage $SS_1$ is followed by a second stage $SS_2$ at which the reception control circuit 62 checks whether or not a self-call number code preassigned to the pager receiver 12 is included in the digital signal in a manner similar to the third stage illustrated with reference to FIG. 4. The self-call number code is stored in read-only memory 22 along with the synchronizing pattern code and is supplied from the read-only memory 22 to the reception control circuit 62 through the display control circuit 63.

The third stage $SS_3$ proceeds to a fourth stage $SS_4$ on condition that the self-call number code is not detected or received. At the fourth stage $SS_4$, the reception control circuit 62 times a predetermined time interval by the use of a timer circuit (not shown) included therein.

During the predetermined timer interval, the third stage $SS_3$ is repeated by the reception control circuit 62. Otherwise, operation returns from the fourth stage $SS_4$ to the second stage $SS_2$ described before.

At the third stage $SS_3$, let the self-call number code be received or detected by the reception control circuit 62. Then, the reception control circuit 62 energizes the display control circuit 63, as shown at a fifth stage $SS_5$.

Subsequently, a specific one of the message codes I following the call number code N in question is supplied through the reception control circuit 62 to the display control circuit 63. Thus, the specific message code is received by the display control circuit 63 at a sixth stage $SS_6$. At the sixth stage $SS_6$, an error is corrected in a well-known manner, if any.

After the reception of the specific message code, the display control circuit 63 checks if the specific test code is received. Such reception operation is carried out in a manner similar to that illustrated in conjunction with the fourth stage $S_4$ shown in FIG. 4. More specifically, the specific test code specifies the test of the read-only memory 22, as described before, and the display control circuit 63 comprises a display control memory (not shown) storing a specific test pattern code which coincides with the specific test code produced by the transmitting station 11. Under the circumstances, the specific test pattern code is compared with the specific test code under control of the display control circuit 63. For such comparison, the display control circuit 63 comprises a display control section similar to a combination of the controller 32, the arithmetic logic unit 41, and the accumulator 42, all of which are illustrated in FIG. 3.

Unless the specific test pattern code is detected, the display control circuit 63 carries out operation in the normal mode at an eighth stage $SS_8$ in a manner similar to that described in conjunction with the stage $S_3$ of FIG. 4.

In the normal mode, the driver circuit 23 is driven to make the loudspeaker 24 produce the call tone in a usual manner. The display control driver 64 is also driven by the display control circuit 63. More specifically, the specific message code is supplied as a specific one of the display codes to the display control driver 64 to be visually displayed by the display unit 26. The specific display code is directly displayed by the display unit 26 without any code conversion to be presently described when it is representative of a certain decimal number. On the other hand, the specific dislay code should be converted into a prescribed one of the key codes that is in one-to-one correspondence to the specific display code when it indicates a certain symbol except a decimal number. For this purpose, the read-only memory 22 is accessed by the specific display code under control of the display control circuit 63 to supply the prescribed key code to the display control driver 64. Each of the display codes or the key codes may specify at least one of the alphanumeric symbols. At any rate, the display unit 26 continues to display message carried by the specific message code during a particular time interval of, for example, 8 seconds. After the elapse of the particular time interval, the display unit 26 is deenergized to erase displays. At the same time, the other elements 22, 63, and 64 relating to display operation are also deenergized by the use of the second power control circuit 67.

After the driver circuit 23 and the display control driver 64 are driven by the display control circuit 63, operation returns back to the second stage SS$_2$.

Now, let the specific test code be detected by the display control circuit 63 at the seventh stage SS$_7$ in the afore-mentioned manner. At this time, the display control circuit 63 produces a specific test mode signal representative of the test of the read-only memory 22 and is therefore operable as a test mode signal producing circuit. The specific test mode signal is delivered from the display control circuit 63 to the read-only memory 22.

The display control memory included in the display control circuit 63 stores a reading program for reading all of the key codes out of the read-only memory 22. The reading program serves to make the display unit 26 successively and visually display all of the key codes.

When the specific test mode signal is detected, the display control circuit 63 executes the display program at a ninth stage SS$_9$ to read all of the key codes out the read-only memory 22 enabled by the specific test mode signal. As a result, every key code is successively sent one at a time from the read-only memory 22 to the display unit 26 through the display control circuit 63 and the display control driver 64 and is displayed a preselected duration which may be equal to the particular time interval described in conjunction with the normal mode.

Thus, the illustrated read-only memory 22 is operable to successively produce the key codes stored therein in response to the test mode signal.

It is mentioned here that the read-only memory 22 stores an end code representing an end of the key codes.

When the end code is detected by the display control circuit 63 at a tenth stage SS$_{10}$, execution of the reading program is finished in the display control circuit 63 and operation returns back to the second stage SS$_2$.

Although only the key codes are read out of the read-only memory 22 in the illustrated example, the remaining codes, such as the self-call number code and the like, may be all read out of the read-only memory 22 to be displayed by the display unit 26. In any event, the information signal sequence may be either all of the key codes or all of the key codes and the remaining codes and is stored in the read-only memory 22 as stored codes. As a result, the entirety of the stored codes is successively displayed by the display unit 26 in the test mode.

The specific test code may be substituted for the frame synchronizing code F or the call number code N illustrated in FIG. 2, in order to simultaneously test each read-only memory of all of pager receivers included in the pager system.

The specific test mode signal may be produced by a manually operable switch, in the manner described in conjunction with FIG. 3.

With the pager receiver 12 illustrated in FIG. 6, it is possible to use a conventional reception control circuit as the illustrated reception control circuit 62. In other words, the display control circuit 63 alone may be changed in structure to make the display control memory thereof store the reading program. In addition, the read-only memory 22 can be tested by supplying the pager receiver with the specific test code only one time because all of the key codes and the like are automatically successively read out of the read-only memory 22 in response to the specific test mode signal related to the specific test code. The pager receiver can therefore be readily tested in a short time. The pager receiver 12 is more effective as the display data are increased.

While this invention has thus far been described in conjunction with a few embodiments thereof, it is readily possible for those skilled in the art to put this invention into practice in various other manners. For example, the pager receiver illustrated in FIG. 3 can test the contents of the program memory 30 instead of the display unit 26, as is the case with that illustrated in FIG. 6. In this event, the program memory 30 may comprise an area for storing the reading program and the controller 32 may detect the specific test code specifying the test of the program memory 30 to make the arithmetic logic unit 41 produce the test mode signal representative of the test of the program memory 30. Such a test of the program memory 30 may be carried out in addition to the test of the display unit 26 by the use of the test mode signal different from the test mode signal for testing the display unit 26 in level or pattern. It is needless to say that the specific test code also differs from the predetermined test code when both of the program memory 30 and the display unit 26 are tested in response to the specific and the predetermined test codes. In FIG. 3, the key codes may be stored in the read-only memory 22 and the read-only memory 22 may be tested in response to the specific test code, like in FIG. 6. Alternatively, only the display test can be carried out in the pager receiver illustrated in FIG. 6 instead of or in addition to testing the read-only memory 22. In this case, the information signal sequence may be stored in the read-only memory 22 to provide displays as shown in FIG. 5. Thus, it is possible to carry out a plurality of tests in response to a plurality of test codes for specifying the respective tests.

At any rate, the information signals stored in the read-only memory or the program memory may be manually read out of the memory one by one to be displayed by the display unit a predetermined duration. Such operation is accomplished by manually putting into operation a switch, such as the switch illustrated by the broken line block in FIG. 3 and by monitoring the switch by the use of the controller 32 or the display control circuit 63.

Finally, similar operation is also accomplished by the use of a POCSAG (The British Post Office Code Standardisation Advisory Group) code proposed in the paper "A standard code for radiopaging" published by British Post Office (July, 1979). Such a code comprises a plurality of groups each of which includes a group synchronizing code, a plurality of call number codes, and a plurality of message codes.

What is claimed is:

1. A pager receiver comprising a radio signal receiving portion responsive to a radio calling signal for producing a sequence of demodulated signals, a decoding portion for decoding said demodulated signal sequence to carry out an operation in accordance with said demodulated signal sequence, and a display unit coupled to said decoding portion for providing visual displays when said display unit is driven by said decoding unit, said radio calling signal carrying a test mode signal which is indicative of a test mode and which is demodulated into a specific one of said demodulated signals, said decoding unit comprising:

detecting means responsive to said demodulated signals for detecting said specific one of the demodulated signals; and signal delivery means operatively coupled to said detecting means and said display unit for delivering a test data signal to said display unit in response to said specific one of the demodulated signals so as to test said display unit.

2. A pager receiver as claimed in claim 1, said display unit comprising a plurality of display segments, wherein said test data signal is for causing a visual display in all of said display segments.

3. A pager receiver as claimed in claim 2, wherein said signal delivery means comprises:

storage means for storing information signals which are for driving all of the display segments; and supply means coupled to said detecting means, said storage means, and said display unit for supplying said information signals to said display unit as said test data signal in response to said specific one of the demodulated signals.

4. A pager receiver as claimed in claim 1, wherein said radio calling signal includes a preamble signal, a call number signal following said preamble signal, and data signals following said call number signal, and wherein said test mode signal is included in any one of said preamble, said call number, and said data signals and is exclusively used in said test mode alone.

5. A pager receiver as claimed in claim 4, said display unit comprising a plurality of display segments, wherein said test data signal is for causing a visual display in all of said display segments.

* * * * *

UNITED STATES PATENT AND TRADEMARK OFFICE
CERTIFICATE OF CORRECTION

PATENT NO. : 4,599,615
DATED : July 8, 1986
INVENTOR(S) : Shinjiro UMETSU et al

It is certified that error appears in the above-identified patent and that said Letters Patent is hereby corrected as shown below:

Column 10, Line 51, delete "dislay", and insert therefor

--display--.

Signed and Sealed this

Third Day of February, 1987

Attest:

DONALD J. QUIGG

Attesting Officer

Commissioner of Patents and Trademarks